US006744358B1

(12) United States Patent
Bollinger

(10) Patent No.: US 6,744,358 B1
(45) Date of Patent: Jun. 1, 2004

(54) MESSAGE RECORD/PLAY ARRANGEMENT FOR PUBLIC VEHICLE

(76) Inventor: Lester E. Bollinger, 401 E. El Camino Dr., Phoenix, AZ (US) 85020

(*) Notice: Subject to any disclaimer, the term of this patent is extended or adjusted under 35 U.S.C. 154(b) by 89 days.

(21) Appl. No.: 09/935,133

(22) Filed: Aug. 21, 2001

Related U.S. Application Data

(60) Provisional application No. 60/226,718, filed on Aug. 21, 2000.

(51) Int. Cl.[7] .................. B60Q 5/00

(52) U.S. Cl. .................. 340/460; 340/433

(58) Field of Search .................. 340/22, 433, 434, 340/438, 457, 459, 460, 901, 904, 944; 701/1, 211

(56) References Cited

U.S. PATENT DOCUMENTS 4,713,661 A * 12/1987 Boone et al. ............... 340/994
4,839,749 A * 6/1989 Franklin ............... 360/12
5,467,071 A * 11/1995 Koenig ............... 340/433
5,604,479 A * 2/1997 Chang ............... 340/384.7
5,874,893 A * 2/1999 Ford ............... 340/460
5,963,151 A * 10/1999 Hubbard ............... 340/996
6,067,008 A * 5/2000 Smith ............... 340/438
6,177,887 B1 * 1/2001 Jerome ............... 725/76
6,452,510 B1 * 9/2002 Zysko ............... 340/970

* cited by examiner

*Primary Examiner*—Scott L. Weaver
(74) *Attorney, Agent, or Firm*—Rohm & Monsanto, P.L.C.

(57) ABSTRACT

A system for enabling communication between one of a plurality of riders of a vehicle and an operator of the vehicle, wherein each rider has associated therewith at least one of a plurality of predetermined conditions, which may be normal and handicapped conditions. A first memory stores a first message associated with a first one of the predetermined conditions, and a second memory stores a second message that is associated with a second one of the predetermined conditions. An announcement system issues an indication perceptible to the operator of the vehicle and to the plurality of riders of the vehicle. A coupling arrangement couples the first and second memories to the announcement system. First and second actuation arrangements manipulable by the riders of the vehicle having associated therewith the respective first and second predetermined conditions are provided, whereby when the first actuation arrangement is actuated by a rider of the vehicle, the first message is announced by the announcement system, and when the second actuation arrangement is actuated by a rider of the vehicle, the second message is announced by the announcement system. The first and second memories are respective electronic digital memories, and the respective first and second messages are stored in respective ones of the electronic digital memories as .WAV files, MP3 files, or data files.

18 Claims, 5 Drawing Sheets

100

MESSAGE RECORD/PLAY ARRANGEMENT FOR PUBLIC VEHICLE

CROSS REFERENCE TO RELATED APPLICATION(S)

This application is a continuation of, and claims the benefit under 35 U.S.C. § 119(e) of, U.S. Ser. No. 60/226,718 filed on Aug. 21, 2000.

BACKGROUND OF THE INVENTION

1. Field of the Invention

This invention relates generally to messaging systems for public vehicles, and more particularly, to a system for providing audible indication through a public address system in public vehicle in response to rider action.

2. Description of the Related Art

In the prior art, chimes have been used to permit a passenger in a public vehicle, such as a bus, to communicate with the vehicle operator a desire to exit the vehicle at the next scheduled stop. In addition, known chime arrangements for buses, because of their size, the passengers throughout the bus have not been able to hear them clearly, even though chime arrangements are disposed near the vehicle operator and in the rear of the vehicle. Thus, passengers in the vehicle who desire to exit same at the next stop, but are disposed within the vehicle at a distance from the conventional signaling arrangement, will repeatedly signal the operator because they have not heard the prior signals of other passengers.

In addition to the foregoing, conventional public vehicle stop request arrangements have not distinguished able riders from handicapped riders. Thus, physically challenged riders who require assistance from the vehicle operator in leaving the vehicle typically have no way of signaling their need to the vehicle operator.

It is, therefore, an object of this invention to provide a public vehicle signaling arrangement that readily can be heard by passengers throughout the public vehicle.

It is another object of this invention to provide a public vehicle signaling arrangement that permits multiple type of signals to be issued whereby the vehicle operator can identify the needs of the passenger(s) desiring to exit the public vehicle.

It is also an object of this invention to provide a public vehicle signaling arrangement that provides a verbal confirmation to the passenger(s) of the acceptance of the request to exit the public vehicle at the next stop.

SUMMARY OF THE INVENTION

The foregoing and other objects are achieved by this invention, which provides a chime-like announcement unit that plays a chime-like sound and/or a message by way of the public address system on a public vehicle, such as a bus. By using the public address system, the passengers throughout the bus readily can hear the chime-like sound.

In accordance with a method aspect of the invention, there is provided a method of enabling communication between one of a plurality of riders of a vehicle and an operator of the vehicle, each rider having associated therewith at least one of a plurality of predetermined conditions. The method includes the steps of:

recording in a first memory a first message, the first message being associated with a first one of the predetermined conditions;

recording in a second memory a second message, the second message being associated with a second one of the predetermined conditions;

coupling the first and second memories to an announcement system that can be perceived by the operator of the vehicle and the plurality of the riders of the vehicle;

first providing a first actuation arrangement manipulable by the riders of the vehicle having associated therewith the first predetermined condition; and second providing a second actuation arrangement manipulable by the riders of the vehicle having associated therewith the second predetermined condition, whereby when the first actuation arrangement is actuated by a rider of the vehicle, the first message is announced by the announcement system, and when the second actuation arrangement is actuated by a rider of the vehicle, the second message is announced by the announcement system.

In one embodiment of this method aspect of the invention, the first and second memories are respective electronic digital memories, and the respective first and second messages are stored in respective ones of the electronic digital memories as .wav files. In other embodiments, the respective first and second messages are stored in respective ones of the electronic digital memories as MP3 files.

In a highly advantageous embodiment of the invention, at least one of the first and second messages stored in a respective one of the electronic digital memories is a data file, and the announcement system is operated in response to the information in the data file. The stored data is not limited to audio files, but may include text that will be presented in a visual announcement system, or flashing visual indicators, or the like. As such, therefore the announcement system includes in this embodiment a visual indicator responsive to the information in the data file.

In some embodiments of the invention, the respective electronic digital memories consist of respective memory areas of a unitary electronic digital memory. The unitary electronic digital memory may be integrated in a single-chip record/playback device.

When the method of the present invention is used in the context of a large vehicle, such as where the vehicle is a public bus, the first condition corresponds to a normal rider of the vehicle, and the second condition corresponds to a handicapped rider of the vehicle.

In accordance with an apparatus aspect of the invention, there is provided a system for enabling communication between one of a plurality of riders of a vehicle and an operator of the vehicle, each rider having associated therewith at least one of a plurality of predetermined conditions. In accordance with the apparatus aspect of the invention, there is provided a first memory for storing a first message, the first message being associated with a first one of the predetermined conditions, and a second memory for storing a second message, the second message being associated with a second one of the predetermined conditions. An announcement system is provided for issuing an indication perceptible to the operator of the vehicle and the plurality of riders of the vehicle. A coupling arrangement couples the first and second memories to an announcement system that can be perceived by the operator of the vehicle and the plurality of the riders of the vehicle. First and second actuation arrangements manipulable by the riders of the vehicle having associated therewith the respective first and second predetermined conditions are provided, whereby when the first actuation arrangement is actuated by a rider of the vehicle, the first message is announced by the announcement system, and when the second actuation arrangement is actuated by a rider of the vehicle, the second message is announced by the announcement system.

In one embodiment of this system aspect of the invention, the first and second memories are respective electronic digital memories, and the respective first and second messages are stored in respective ones of the electronic digital memories as .wav files. In other embodiments, the respective first and second messages are stored in respective ones of the electronic digital memories as MP3 files.

In a highly advantageous embodiment of the system aspect of the invention, at least one of the first and second messages stored in a respective one of the electronic digital memories is a data file, and the announcement system is operated in response to the information in the data file. The stored data is not limited to audio files, but may include text data that will be presented in a visual announcement system, or flashing visual indicators, or the like. As such, therefore the announcement system includes in this embodiment a visual indicator responsive to the information in the data file.

In some embodiments of the invention, the respective electronic digital memories consist of respective memory areas of a unitary electronic digital memory. The unitary electronic digital memory may be integrated in a single-chip record/playback device.

When the system of the present invention is used in the context of a large vehicle, such as a public bus, the first condition corresponds to a normal rider of the vehicle, and the second condition corresponds to a handicapped rider of the vehicle.

In a specific illustrative embodiment of the invention, there is provided an audio record chip in which is stored a chimes signal. In a typical embodiment, a single "DING" is used to announce actuation of the system by regular passengers, and a dual "DING" (i.e., DING DONG) announces actuation by a handicapped passenger. This audio signal may, in certain embodiments of the invention, announce a voice message that would state, for example, "next stop accepted." The particular statement to be uttered by the system over the public address system can be predetermined to meet the specific requirements of the operator of the transit system.

The audio chip plays the message after the signal is made via the cable switch system which is standard by way of the multiplexer on the bus. Alternatively, the system will also operate with a switch contact made by the passengers. By implementing both of these circuits, the system of the present invention it can be used on any existing bus, regardless of its existing public address system, or on a new bus.

The audio chime-like playback system of the present invention is made to interface with any commercially available public address amplifier common to the transit industry.

The unit is made to play back an audio chime signal to the passengers in a bus, thereby confirming to them that a stop at the next predetermined bus stop location has been requested.

In addition to the chime-like sound, this system will, in certain embodiments, play a predetermined audio voice announcement that will provide to the passengers verbal recognition of the stop request.

In one embodiment, the system operates as follows:

A passenger either pulls a cable or presses a switch strip to request that the vehicle operator stop at the next bus stop on the route. As this occurs, a chime "DING" is played to alert the vehicle operator to stop the bus. In addition, an optional voice announcement states "NEXT STOP ACCEPTED." This voice feature can be included when the unit is ordered by the transit system operator.

In the case of a handicapped passenger who needs to exit the bus at the next stop, such a passenger would press a "handicap" switch that has been designated for handicapped passengers. When this is done, a chime-like "DING DONG" signal is sounded throughout to the bus whereby the vehicle operator is informed that a handicapped passenger both, wants to leave the bus and will require his assistance at this stop. As stated, the Ding Dong chime-like sound can be followed, in certain embodiments of the invention, by a corresponding voice announcement.

By incorporating the chime/voice system into the public address system, the vehicle operator and all the passengers are alerted that the next stop request has been made.

As will be described in detail hereinbelow, the system contains a recording integrated circuit chip that includes therein stored data that corresponds to the chime's "DING DONG" sound, and optionally, a message that would follow the "DING" or "DING DONG" that would say, for example, "NEXT STOP ACCEPTED."

BRIEF DESCRIPTION OF THE DRAWING

Comprehension of the invention is facilitated by reading the following detailed description, in conjunction with the annexed drawing, in which.

DETAILED DESCRIPTION

Figure 1A:
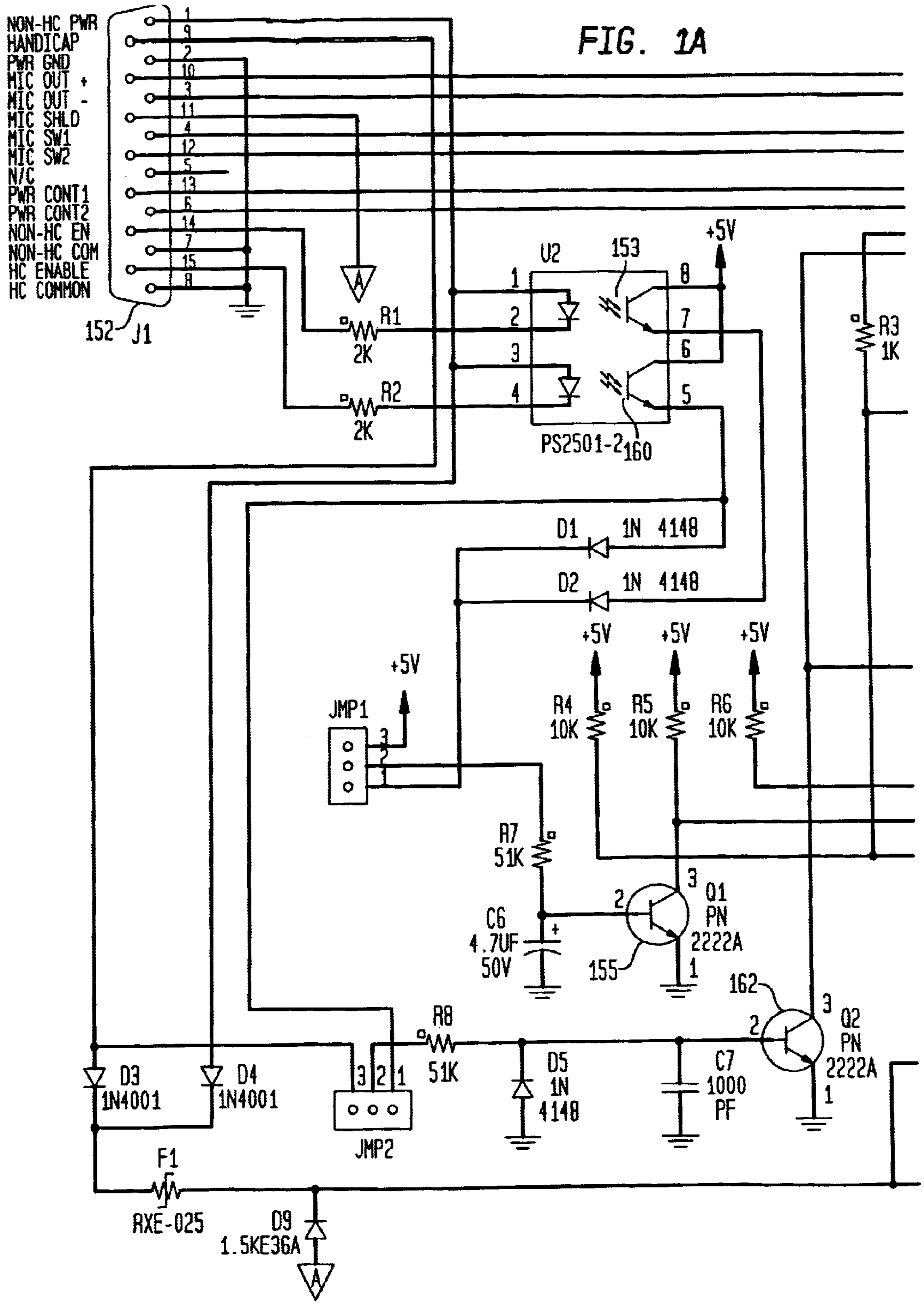
FIG. 1 is a schematic representation of a specific illustrative embodiment of the invention.
Figure 1B:
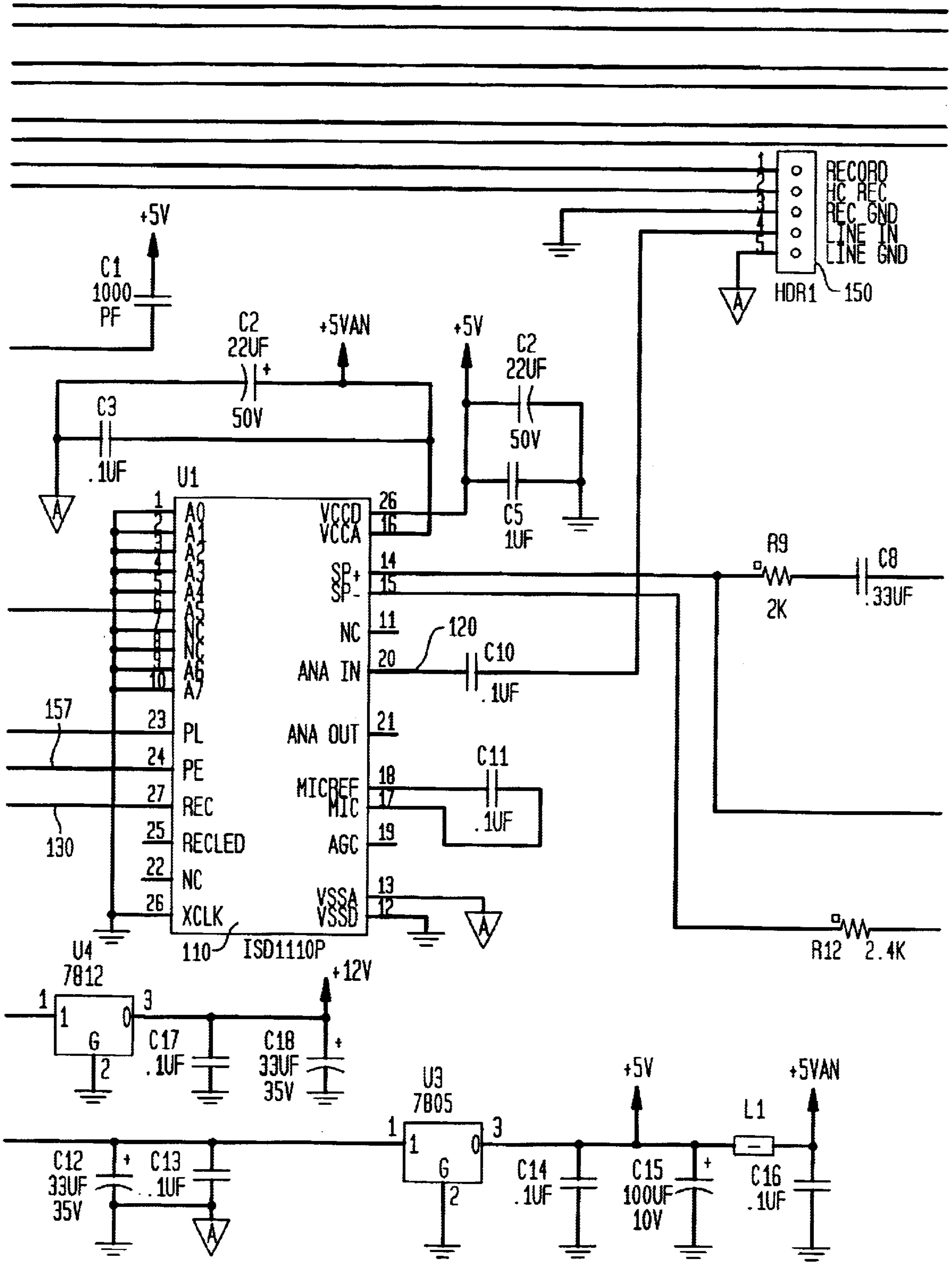
Figure 1C:
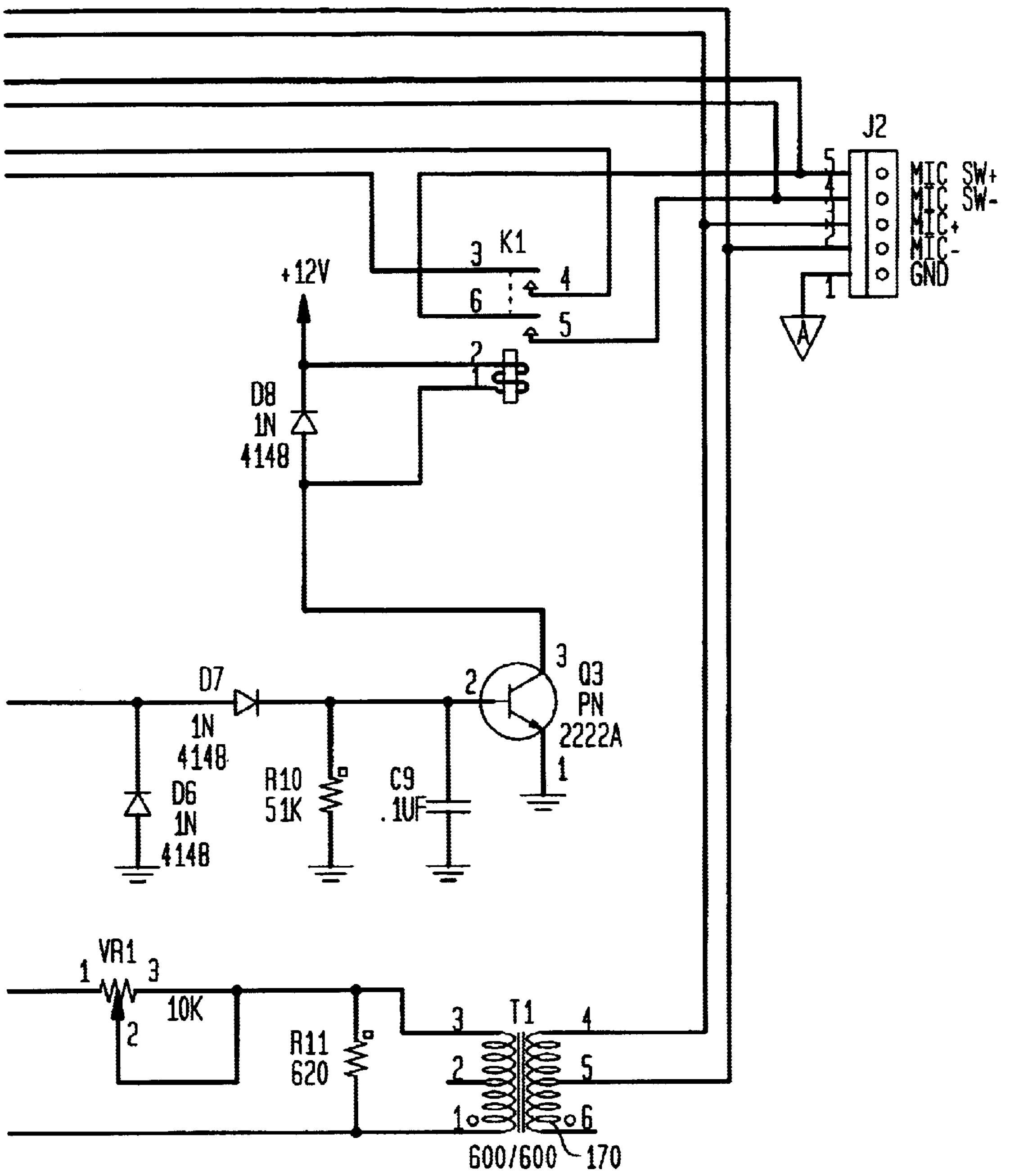

FIG. 1 is a schematic illustration that represents a specific illustrative embodiment of the invention. More specifically, a message record/play arrangement 100 is formed about a single-chip record/playback device 110. In the practice of the invention, single-chip record/playback device 110 may be an Information Storage Devices' ISD1110 ChipCorder® CMOS single-chip device. Information Storage Devices is headquartered at 2727 North First Street, San Jose, Calif. 95134, USA.

In this specific illustrative embodiment of the invention, single-chip record/playback device 110, being an ISD1110, has a message duration of about 10 seconds, the input thereto being sampled at a rate of 6.4 kHz with a typical filter pass band of 2.6 kHz.

Figure 2:
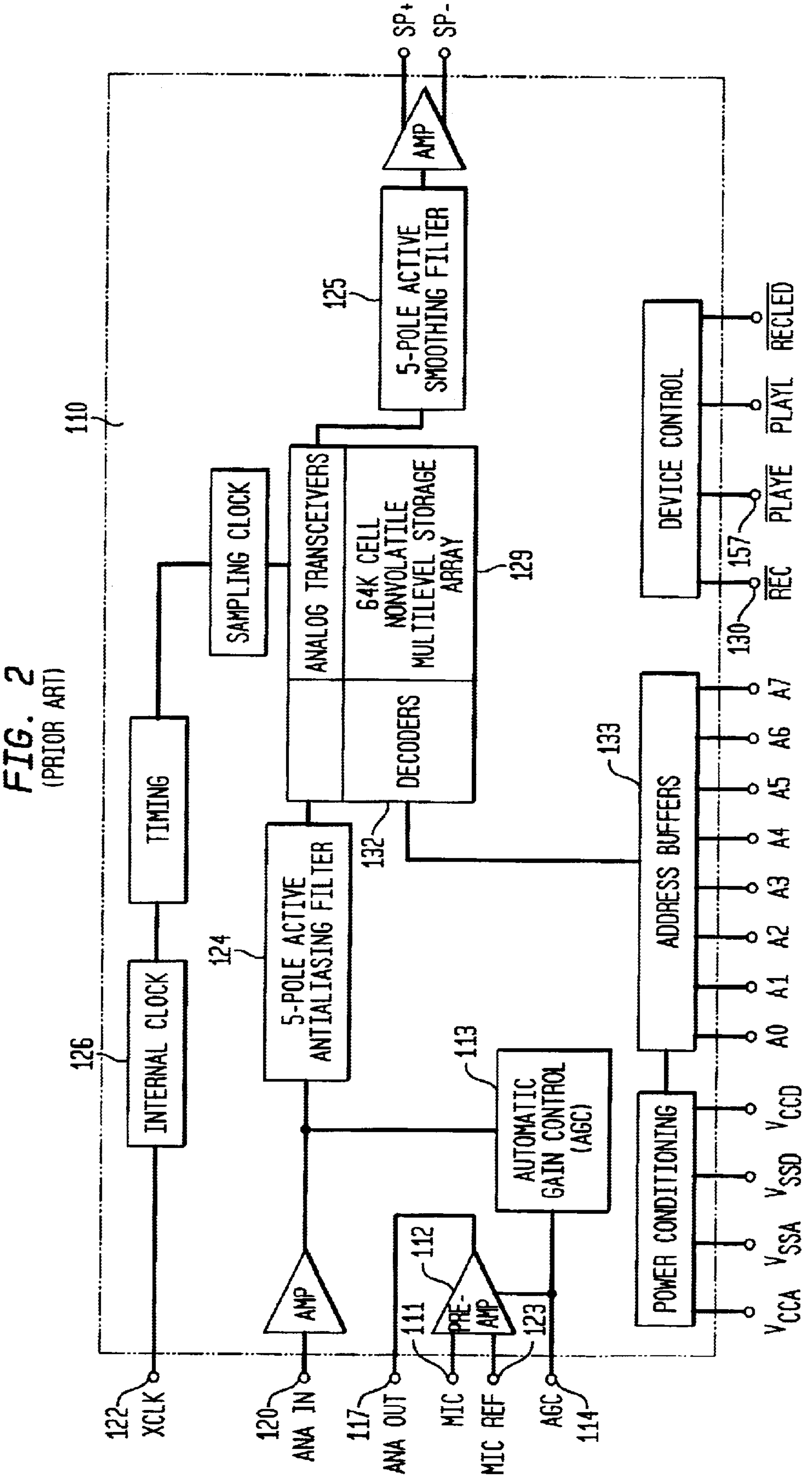
FIG. 2 (PRIOR ART)
FIG. 2 (Prior Art) is a function block representation of the major internal components of the single-chip record/playback device employed in the circuit structure of FIG. 1.
Figure 3:
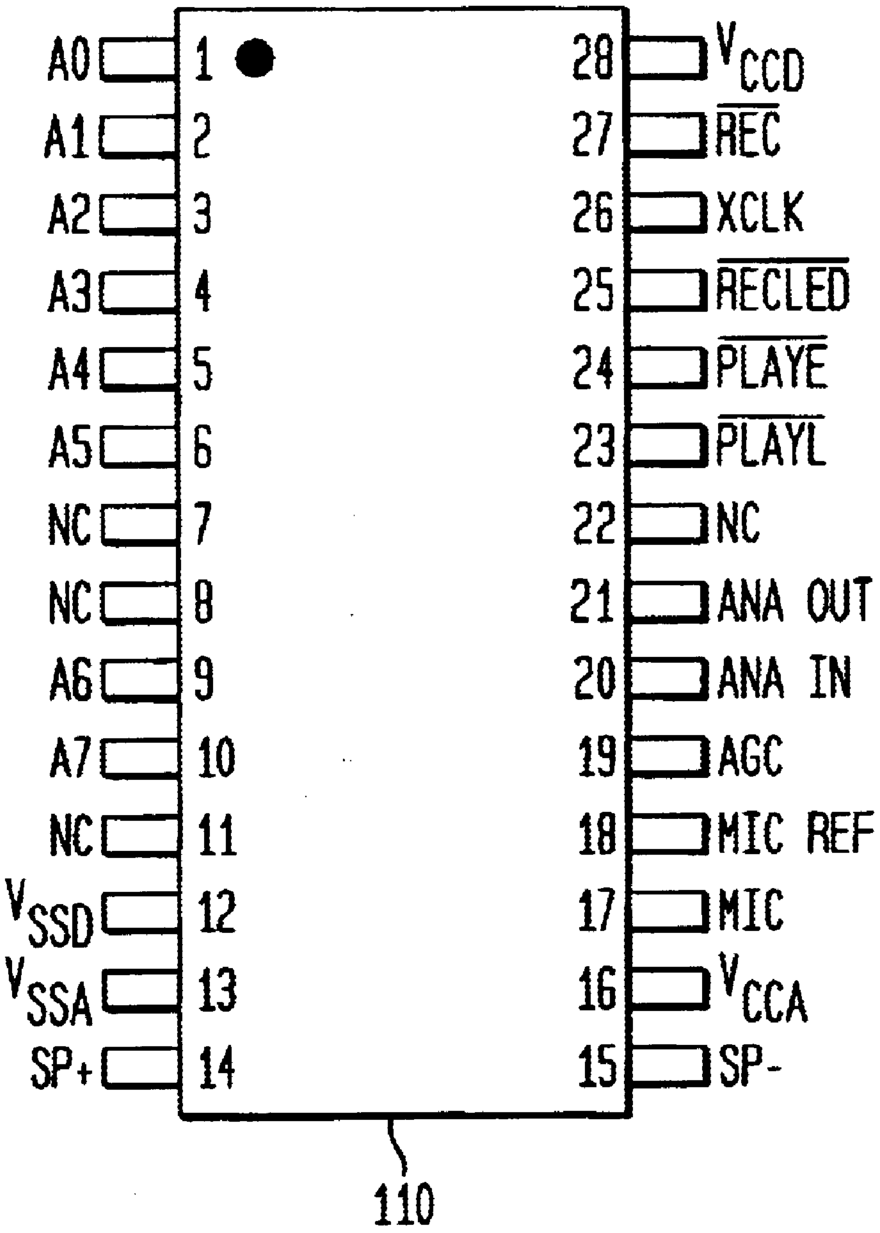
FIG. 3 (PRIOR ART)
FIG. 3 (Prior Art) is a pin diagram that is useful for describing the pins and functionalities of a single-chip record/playback device employed in the circuit structure of FIG. 1.

FIG. 2 (Prior Art) is a function block representation of the major internal components of the single-chip record/playback device employed in the circuit structure of FIG. 1, and FIG. 3 (Prior Art) is a pin diagram that is useful for describing the pins and functionalities of a single-chip record/playback device employed in the circuit structure of FIG. 1. Referring for the moment to FIGS. 2 and 3, it is seen that the functions and pins of single-chip record/playback device 110, specifically the ISD1110 ChipCorder®, are denominated as follows:

Voltage Inputs ($V_{CCA}$, $V_{CCD}$)

Analog and digital circuits internal to single-chip record/playback device 110 use separate power buses (not shown in these figures) to minimize noise on the chip, These power buses are brought out to separate pins on the package and should be tied together as close to the supply as possible. It is important that the power supply (not shown in these figures) be decoupled as close as possible to the package.

Ground Inputs ($V_{SSA}$, $V_{SSD}$)

Similar to $V_{CCA}$ and $V_{CCD}$, the analog and digital circuits internal to single-chip record/playback device 110 uses separate ground buses to minimize noise. These pins should be tied together as close as possible to the device.

Record (REC)

A REC input 130 is an active-LOW record signal. In this specific illustrative embodiment of the invention, the device records whenever REC is LOW. This signal must remain LOW for the duration of the recording. REC takes precedence over either playback (PLAYE or PLAYL) signal. If REC is pulled LOW during a playback cycle, the playback immediately ceases and recording begins.

A record cycle is completed when REC is pulled HIGH. An end-of-message (EOM) marker is internally recorded, enabling a subsequent playback cycle to terminate appropriately. The device automatically powers down to standby mode when REC goes HIGH. This pin has an internal pull-up device (not shown in these figures).

Playback, Edge-Activated (PLAYE)

When a LOW-going signal transition is detected on this input, a playback cycle begins. Playback continues until an end-of-message marker is encountered or the end of the memory space is reached. Upon completion of the playback cycle, the device automatically powers down into standby mode. Taking PLAYE HIGH during a playback cycle will not terminate the current cycle. This pin has an internal pull-up device.

Playback, Level-Activated (PLAYL)

When this input signal transitions from HIGH to LOW, a playback cycle is initiated. Playback continues until PLAYL is pulled HIGH, an end-of-message marker is detected, or the end of the device space is reached. The device automatically powers down to standby mode upon completion of the playback cycle. This pin has an internal pull-up device.

Record LED Output (RECLED)

Output RECLED is LOW during a record cycle. It can be used to drive an LED to provide feedback that a record cycle is in progress, In addition, RECLED pulses LOW momentarily when an end-of-message marker is encountered in a playback cycle.

Microphone Input (MIC)

A microphone input 111 transfers its signal to an on-chip preamplifier 112. An on-chip Automatic Gain Control (AGC) circuit 113 controls the gain of preamplifier 112 from −15 to 24 dB. An external microphone (not shown in these figures) should be AC coupled to this pin via a series capacitor (not shown in these figures), The capacitor value, together with the internal 10 kΩ resistance (not shown in these figures) on this pin, determine the low-frequency cutoff for single-chip record/playback device 110.

Microphone Reference (MIC REF)

A MIC REF input 123 is the inverting input to microphone preamplifier 112. This provides a noise-canceling, or common-mode rejection, input to single-chip record/playback device 110 when connected differentially to a microphone (not shown in this figure).

Automatic Gain Control (AGC)

An AGC circuit 113 dynamically adjusts the gain of preamplifier 112 to compensate for a wide range of microphone input levels. AGC circuit 113 allows the full range of sound, from whispers to loud sounds, to be recorded with minimal distortion. The “attack” time is determined by the time constant of a 5 kΩ internal resistance (not shown in this figure) and an external capacitor (not shown in this figure) connected from an AGC pin 114 to $V_{SSA}$ analog ground. The “release” time is determined by the time constant of an external resistor (not shown in this figure) and an external capacitor (not shown in this figure) connected in parallel between AGC pin 114 and $V_{SSA}$ analog ground. Nominal values of 470 kΩ and 4.7 μF will give satisfactory results in most cases.

Analog Output (ANA OUT)

An ANA OUT pin 117 provides the output of preamplifier 112 to the user. The voltage gain of the preamplifier is determined by the voltage level at AGC pin 114.

Analog Input (ANA IN)

An ANA IN pin 120 transfers the input signal to single-chip record/playback device 110 recording. For microphone inputs, ANA OUT pin 117 should be connected via an external capacitor (not shown in these figures) to ANA IN pin 120. This capacitor value, together with the 3 kΩ input impedance at ANA IN, is selected to give additional cutoff at the low-frequency end of the voice passband. If the desired input is derived from a source (not shown in this figure) other than a microphone, the signal can be supplied, capacitively coupled, into the ANA IN pin directly.

Optional External Clock (XCLK)

An XCLK external clock input pin 122 on single-chip record/playback device 110 has an internal pull-down resistor (not shown in these figures). Single-chip record/playback device 110 is configured at the factory with an internal sampling clock frequency that establishes its minimal nominal record/playback time. For instance, when single-chip record/playback device 110 is operating within specification it will always be observed to have a minimum of 10 seconds of recording time. The sampling frequency is maintained to a total variation of ±2.25 percent over the commercial temperature and operating voltage ranges while still maintaining the minimum duration specified, This will result in same devices having a few percent more than nominal recording time. If greater precision is required, single-chip record/playback device 110 can be clocked through XCLK external clock input pin 122 at a sample rate of 6.4 kHz requiring a clock rate of 819.2 kHz.

These recommended clock rates should not be varied because an antialiasing filter 124 and a smoothing filter 125 are fixed, and aliasing problems can occur if the sample rate differs from that recommended. The duty cycle on input clock 126 is not critical, as the clock is immediately divided by two internally. If the XCLK external clock input pin 122 is not used, this pin should be connected to ground.

Speaker Outputs (SP+, SP−)

The SP+ and SP− pins provide direct drive for one or more loud-speakers (not shown in these figures) with impedances as low as 16Ω. A single output may be used. However, for direct-drive loudspeakers, the two opposite-polarity outputs provide an improvement in output power of up to four times over a single-ended connection. Furthermore, when SP+ and SP− are used, a speaker-coupling capacitor is not required. A single-ended connection will require an AC-coupling capacitor between the SP pin and the speaker. The speaker outputs are in a high-impedance state during a record cycle, and held at $V_{SSA}$ during power-down.

Address Inputs (A0–A7)

The address Inputs have two functions, depending upon the level of the two Most Significant Bits (MSB) of the address (A6 and A7).

If either of the two MSBs is LOW, the inputs are all interpreted as address bits and are used as the start address for the current record and playback cycle. The address pins are inputs only and do not output internal address information as the operation progresses. Address inputs are latched by the falling edge of PLAYE, PLAYL or REC. A6 and A7 have internal pull-up devices (not shown in these figures). A0, A1, A2, A0, A4, and A5 have internal pull-down devices (not shown in these figures). This allows the signals to be left floating if not used. Each of these internal pull-up or pull-down devices have a value of 50 kΩ to 100 kΩ.

Looping Capability

Single-chip record/playback device 110 has a built-in looping function enabling it to repeat continuously a single message. This is accomplished by taking A0 HIGH to loop continuously from the end of the message to the beginning of the message space. Looping is initiated by a negative transition on PLAYE pin with A7, A6 and A0 held HIGH. Then, PLAYE is brought back HIGH. Looping will continue indefinitely with all three control pins (PLAYL, PLAYE, REC) remaining HIGH.

To stop the looping, the PLAYL pin is momentarily taken LOW, then back HIGH. As long as A7, AD and A0 remain HIGH, a new playback loop will begin with the next negative transition on the PLAYE pin. Another way to control looping is to use PLAYL pin alone. Taking this pin LOW begins the looping and it continues until the pin is taken HIGH again. This is a continuous control rather than the pulsed control previously stated.

FIG. 3 further shows a storage array 129 where sampled data corresponding to the messages and sounds desired to be played in the public vehicle are stored. In this specific illustrative embodiment of the invention, approximately 10 seconds of messages can be stored in storage array 129, each of which is assigned a predetermined memory space determined by decoders 132 and address buffers 133, as controlled by appropriate signals applied to address pins A0 to A7.

Referring now to FIG. 1, it is seen that inputs are provided at a terminal block 150, which in this specific illustrative embodiment of the invention, is provided with RECORD, HC REC, and LINE IN inputs. The RECORD input is coupled to REC input 130 of single-chip record/playback device 110. When this input is brought low, the signal at LINE IN of terminal block 150 is recorded at ANA IN terminal 120 of single-chip record/playback device 110.

When it is desired to record a message for replay in response to a handicapped passenger, the HC REC input of terminal block 150, which is coupled to address pin A5, causes pin A5 to function as an address (since pins A6 and A7 are both low), causes a record cycle to start, wherein the recorded information is again provided through the LINE IN terminal of terminal block 150 and ANA IN pin 120 of single-chip record/playback device 110.

When a non-handicapped passenger desires to exit the bus, a signal, resulting from the pulling of a signal cord (not shown in these figures) or the application of pressure to a switch strip (not shown in these figures) will cause a signal to be delivered to the NON-HC EN terminal of a junction block 152. The NON-HC EN terminal is coupled to a first opto-isolator 153 that causes a switch 155 to apply an activation signal to PLAYE terminal 157 (designated as PE in FIG. 1) of single-chip record/playback device 110. On the other hand, when a handicapped passenger desires to exit the bus, a signal, resulting from the pulling of an appropriately designated signal cord (not shown in these figures) or the application of pressure to an appropriately designated switch strip (not shown in these figures) will cause a signal to be delivered to the HC ENABLE terminal of junction block 152. The HC ENABLE terminal is coupled to a second opto-isolator 160 that causes switch 155 to apply an activation signal to PLAYE terminal 157 (designated as PE in FIG. 1) of single-chip record/playback device 110, and also a switch 162 to apply an activation signal to address terminal A5. Thus, the message that previously had been recorded at memory location A5 is played.

During playback of either message, the corresponding output audio signal is provided at terminals SP+ and SP− of single-chip record/playback device 110, propagated through a transformer 170, and is made available at terminals MIC. OUT+ and MIC. OUT− of junction block 152. In one specific illustrative embodiment of the invention, the speaker output is attenuated so that it can be supplied to the microphone input of the vehicle's public address system.

Although the invention has been described in terms of specific embodiments and applications, persons skilled in the art can, in light of this teaching, generate additional embodiments without exceeding the scope or departing from the spirit of the invention described herein. For example, persons of ordinary skill can configure the arrangement described herein to produce other forms and numbers of messages, using the present or other memory capacities. Additionally, the present invention can be embodied in other electronic systems, such as a computer system that would control the announcement system of the public vehicle. The sound data can be in any appropriate form in addition to a sampled sound signal, such as a .wav file or a compressed MP3 file. Accordingly, it is to be understood that the drawing and description in this disclosure are proffered to facilitate comprehension of the invention, and should not be construed to limit the scope thereof.

What is claimed is:

1. A method of enabling communication between one of a plurality of riders of a vehicle and an operator of the vehicle, each rider having associated therewith at least one of a plurality of predetermined conditions, the method comprising the steps of:

recording in a first memory a first message, the first message being associated with a first one of the predetermined conditions;

recording in a second memory a second message, the second message being associated with a second one of the predetermined conditions;

coupling the first and second memories to an announcement system that can be perceived by the operator of the vehicle and the plurality of the riders of the vehicle;

first providing a first actuation arrangement manipulable by the riders of the vehicle having associated therewith the first predetermined condition; and second providing a second actuation arrangement manipulable by the riders of the vehicle having associated therewith the second predetermined condition, whereby when the first actuation arrangement is actuated by a rider of the vehicle, the first message is announced by the announcement system, and when the second actuation arrangement is actuated by a rider of the vehicle, the second message is announced by the announcement system, whereupon the operator of the vehicle responds accordingly.

2. The method of claim 1, wherein the first and second memories are respective electronic digital memories.

3. The method of claim 2, wherein the respective first and second messages are stored in respective ones of said electronic digital memories as .wav files.

4. The method of claim 2, wherein the respective first and second messages are stored in respective ones of said electronic digital memories as MP3 files.

5. The method of claim 2, wherein at least one of the first and second messages stored in a respective one of the electronic digital memories is a data file, and there is further provided the step of operating the announcement system in response to the information in the data file.

6. The method of claim 5 wherein the announcement system comprises a visual indicator responsive to the information in the data file.

7. The method of claim 2, wherein the respective electronic digital memories comprise respective memory areas of a unitary electronic digital memory.

8. The method of claim 7, wherein the unitary electronic digital memory is integrated in a single-chip record/playback device.

9. The method of claim 1, wherein the vehicle is a public bus, the first condition corresponds to a normal rider of the vehicle, and the second condition corresponds to a handicapped rider of the vehicle.

10. A system for enabling communication between one of a plurality of riders of a vehicle and an operator of the vehicle, each rider having associated therewith at least one of a plurality of predetermined conditions, the system comprising:

a first memory for storing a first message, the first message being associated with a first one of the predetermined conditions;

a second memory for storing a second message, the second message being associated with a second one of the predetermined conditions;

an announcement system for issuing an indication perceptible to the operator of the vehicle and the plurality of riders of the vehicle;

a coupling arrangement for coupling the first and second memories to the announcement system;

a first actuation arrangement manipulable by the riders of the vehicle having associated therewith the first predetermined condition; and a second actuation arrangement manipulable by the riders of the vehicle having associated therewith the second predetermined condition, whereby when the first actuation arrangement is actuated by a rider of the vehicle, the first message is announced by the announcement system, and when the second actuation arrangement is actuated by a rider of the vehicle, the second message is announced by the announcement system, whereupon the operator of the vehicle responds accordingly.

11. The system of claim 10, wherein the first and second memories are respective electronic digital memories.

12. The system of claim 11, wherein the respective first and second messages are stored in respective ones of said electronic digital memories as .wav files.

13. The system of claim 11, wherein the respective first and second messages are stored in respective ones of said electronic digital memories as MP3 files.

14. The system of claim 11, wherein at least one of the first and second messages stored in a respective one of the electronic digital memories is a data file, and there is further provided an arrangement for operating the announcement system in response to the information in the data file.

15. The system of claim 14, wherein the announcement system comprises a visual indicator responsive to the information in the data file.

16. The system of claim 11, wherein the respective electronic digital memories comprise respective memory areas of a unitary electronic digital memory.

17. The system of claim 16, wherein the unitary electronic digital memory is integrated in a single-chip record/playback device.

18. The system of claim 10, wherein the vehicle is a public bus, the first condition corresponds to a normal rider of the vehicle, and the second condition corresponds to a handicapped rider of the vehicle.

* * * * *